United States Patent
Alberti et al.

(10) Patent No.: US 7,814,816 B2
(45) Date of Patent: Oct. 19, 2010

(54) POWER TOOL, BATTERY, CHARGER AND METHOD OF OPERATING THE SAME

(75) Inventors: Daniel J. Alberti, West Allis, WI (US); Scott Bublitz, Hartland, WI (US); Todd Hunkins, Eagle, WI (US); Kenneth R. Jordan, Pewaukee, WI (US); Richard H. Jungmann, Richfield, WI (US); Matthew J. Mergener, Germantown, WI (US); Gary D. Meyer, Waukesha, WI (US); Michael Phillips, Milwaukee, WI (US); John Sara, III, Cedarburg, WI (US); John S. Scott, Brookfield, WI (US); Nancy Uehlein-Procter, Nashotah, WI (US); Jonathan A. Zick, Waukesha, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

(21) Appl. No.: 11/940,814

(22) Filed: Nov. 15, 2007
(Under 37 CFR 1.47)

(65) Prior Publication Data
US 2009/0031865 A1    Feb. 5, 2009

Related U.S. Application Data

(63) Continuation of application No. 11/435,640, filed on May 17, 2006, now Pat. No. 7,557,534.

(60) Provisional application No. 60/682,192, filed on May 17, 2005.

(51) Int. Cl.
*B25B 21/00* (2006.01)

(52) U.S. Cl. .................................................. 81/57.13
(58) Field of Classification Search ............... 81/57.13; 173/216, 217
See application file for complete search history.

(56) References Cited

U.S. PATENT DOCUMENTS 2,106,937 A * 2/1938 Torbert, Jr. ................. 408/127

(Continued)

FOREIGN PATENT DOCUMENTS

CN        2258109 Y      7/1997

(Continued)

OTHER PUBLICATIONS

Panasonic Catalog on website featuring EY503B—2.4V Cordless Drill & Driver, http://catalog2.panasonic.com/webapp/wcs/stores/servlet/vModelDetail?displayTab=O&st..., visited Apr. 28, 2005.

(Continued)

*Primary Examiner*—David B Thomas
(74) *Attorney, Agent, or Firm*—Michael Best & Friedrich LLP

(57) ABSTRACT

A power tool includes a housing assembly having a first housing portion and a second housing portion supported for pivoting movement relative to the first housing portion about a pivot axis. The first housing portion supports a motor. The second housing portion includes a chuck for supporting a tool element. The power tool also includes a gear supported within the housing assembly for rotation relative to at least one of the first and second housing portions about the pivot axis. The gear is operable to transfer drive force from the motor to the tool element.

18 Claims, 14 Drawing Sheets

U.S. PATENT DOCUMENTS

| | | | |
|---|---|---|---|
| 2,348,266 A * | 5/1944 | Selby | 74/417 |
| 2,414,637 A * | 1/1947 | Crump | 173/213 |
| 2,791,142 A * | 5/1957 | Lyon | 81/57.26 |
| 2,876,273 A | 3/1959 | Hall | |
| 3,028,890 A | 4/1962 | Atkinson et al. | |
| 3,101,542 A | 8/1963 | Fodor | |
| 3,734,207 A | 5/1973 | Fishbein | |
| 3,973,605 A | 8/1976 | DeCaro | |
| 4,050,003 A | 9/1977 | Owings et al. | |
| 4,170,909 A | 10/1979 | Wagner | |
| 4,265,984 A | 5/1981 | Kaye | |
| 4,332,147 A | 6/1982 | Grech | |
| 4,347,450 A | 8/1982 | Colligan | |
| 4,410,846 A | 10/1983 | Gerber et al. | |
| 4,522,270 A | 6/1985 | Kishi | |
| 4,567,476 A | 1/1986 | Lang | |
| 4,626,765 A | 12/1986 | Tanaka | |
| 4,638,237 A | 1/1987 | Fernandez | |
| 4,659,976 A | 4/1987 | Johanson | |
| 4,743,831 A | 5/1988 | Young | |
| 4,759,240 A | 7/1988 | Lin | |
| 4,785,540 A | 11/1988 | Arvidsson | |
| 4,876,632 A | 10/1989 | Ostehout et al. | |
| D304,419 S | 11/1989 | Henck et al. | |
| 4,912,349 A | 3/1990 | Chang | |
| 4,962,347 A | 10/1990 | Burroughs et al. | |
| 4,962,681 A | 10/1990 | Yang | |
| 4,976,173 A | 12/1990 | Yang | |
| 5,016,501 A | 5/1991 | Holzer, Jr. | |
| 5,032,825 A | 7/1991 | Kuznicki | |
| 5,065,476 A | 11/1991 | Dohse et al. | |
| 5,105,130 A | 4/1992 | Barker et al. | |
| 5,121,803 A | 6/1992 | Hartmann et al. | |
| 5,122,427 A | 6/1992 | Flowers et al. | |
| 5,130,658 A | 7/1992 | Bohmer | |
| 5,149,230 A | 9/1992 | Nett | |
| 5,213,913 A | 5/1993 | Anthony, III et al. | |
| 5,229,701 A | 7/1993 | Leman et al. | |
| 5,248,929 A | 9/1993 | Burke | |
| 5,251,706 A | 10/1993 | Evans | |
| 5,293,156 A | 3/1994 | Shoji et al. | |
| 5,372,420 A | 12/1994 | Van Deursen et al. | |
| 5,407,381 A | 4/1995 | Schaefer et al. | |
| 5,415,947 A | 5/1995 | Mitsui et al. | |
| 5,489,484 A | 2/1996 | Wheeler et al. | |
| 5,519,383 A | 5/1996 | De La Rosa | |
| RE35,258 E | 6/1996 | Palm | |
| 5,525,889 A | 6/1996 | Chan et al. | |
| 5,533,581 A * | 7/1996 | Barth et al. | 173/216 |
| 5,589,288 A | 12/1996 | Coulson et al. | |
| D377,303 S | 1/1997 | Nagel | |
| 5,620,808 A | 4/1997 | Wheeler | |
| 5,661,942 A | 9/1997 | Palmer | |
| 5,663,011 A | 9/1997 | Bunyea et al. | |
| 5,681,667 A | 10/1997 | Bunyea et al. | |
| D388,060 S | 12/1997 | Tanaka et al. | |
| 5,697,158 A | 12/1997 | Klinzing et al. | |
| 5,718,985 A | 2/1998 | Bunyea et al. | |
| 5,737,982 A | 4/1998 | Lin | |
| 5,751,217 A | 5/1998 | Kchao et al. | |
| 5,778,649 A | 7/1998 | Losdahl et al. | |
| 5,784,934 A * | 7/1998 | Izumisawa | 81/57.26 |
| 5,789,101 A | 8/1998 | Wheeler et al. | |
| 5,798,702 A | 8/1998 | Okamoto et al. | |
| 5,800,940 A | 9/1998 | Bunyea et al. | |
| 5,844,401 A | 12/1998 | Lee | |
| 5,856,038 A | 1/1999 | Mason | |
| 5,919,585 A | 7/1999 | Wheeler et al. | |
| 5,966,079 A | 10/1999 | Tanguay | |
| D418,729 S | 1/2000 | Snider | |
| 6,039,126 A | 3/2000 | Hsieh | |
| 6,050,989 A | 4/2000 | Fox et al. | |
| 6,057,608 A | 5/2000 | Bailey, Jr. et al. | |
| 6,075,341 A | 6/2000 | White et al. | |
| 6,102,134 A | 8/2000 | Alsruhe | |
| 6,102,632 A | 8/2000 | Potter et al. | |
| 6,108,867 A | 8/2000 | Nagashima | |
| 6,139,359 A | 10/2000 | Fuhreck et al. | |
| 6,140,927 A | 10/2000 | Whitmire | |
| 6,144,122 A | 11/2000 | Covell et al. | |
| 6,168,881 B1 | 1/2001 | Fischer et al. | |
| 6,175,303 B1 | 1/2001 | Theofanopoulos et al. | |
| 6,191,557 B1 | 2/2001 | Gray et al. | |
| 6,201,372 B1 | 3/2001 | Green, Jr. et al. | |
| D441,267 S | 5/2001 | Heun | |
| D442,455 S | 5/2001 | Shiao | |
| 6,237,698 B1 | 5/2001 | Carrier et al. | |
| RE37,226 E | 6/2001 | Wheeler et al. | |
| D443,491 S | 6/2001 | Robson | |
| 6,252,380 B1 | 6/2001 | Koenck | |
| D447,924 S | 9/2001 | Neitzell et al. | |
| 6,296,427 B1 | 10/2001 | Potter et al. | |
| 6,297,618 B2 | 10/2001 | Emori et al. | |
| 6,304,058 B2 | 10/2001 | Watson et al. | |
| 6,311,583 B1 * | 11/2001 | Izumisawa | 81/57.13 |
| 6,321,856 B1 | 11/2001 | Alsruhe | |
| 6,329,788 B1 | 12/2001 | Bailey, Jr. et al. | |
| D456,353 S | 4/2002 | Shown et al. | |
| 6,364,033 B1 | 4/2002 | Hung et al. | |
| D457,131 S | 5/2002 | Kitoh et al. | |
| 6,386,730 B1 | 5/2002 | Matthews | |
| 6,396,407 B1 | 5/2002 | Kobayashi | |
| 6,397,709 B1 | 6/2002 | Wall | |
| 6,436,569 B1 | 8/2002 | Dijkstra et al. | |
| 6,439,088 B1 | 8/2002 | Eytchison et al. | |
| 6,461,088 B2 | 10/2002 | Potter et al. | |
| 6,467,556 B2 | 10/2002 | Alsruhe | |
| 6,494,436 B1 | 12/2002 | Hopps | |
| 6,501,197 B1 | 12/2002 | Cornog et al. | |
| 6,515,451 B2 | 2/2003 | Watson et al. | |
| 6,525,511 B2 | 2/2003 | Kubale et al. | |
| D472,439 S | 4/2003 | Chunn et al. | |
| D472,779 S | 4/2003 | Chunn et al. | |
| D475,907 S | 6/2003 | Neitzell et al. | |
| D476,542 S | 7/2003 | Chunn et al. | |
| 6,602,634 B1 | 8/2003 | Wheeler et al. | |
| D479,352 S | 9/2003 | Ng | |
| D479,455 S | 9/2003 | Waldron | |
| 6,650,089 B1 | 11/2003 | Freeman et al. | |
| 6,653,815 B2 | 11/2003 | Watson et al. | |
| 6,653,816 B2 | 11/2003 | Peek et al. | |
| D484,382 S | 12/2003 | Su | |
| 6,656,626 B1 | 12/2003 | Mooty et al. | |
| 6,672,402 B2 | 1/2004 | Ortt et al. | |
| 6,673,485 B2 | 1/2004 | Kimura et al. | |
| D487,383 S | 3/2004 | Ng | |
| D487,384 S | 3/2004 | Neitzell et al. | |
| 6,715,380 B2 | 4/2004 | Listl et al. | |
| 6,725,548 B1 | 4/2004 | Kramer et al. | |
| 6,742,601 B2 | 6/2004 | Numata | |
| 6,750,622 B2 | 6/2004 | Simizu et al. | |
| 6,752,514 B2 | 6/2004 | Parker | |
| 6,771,043 B2 | 8/2004 | Matsunaga et al. | |
| 6,796,385 B1 * | 9/2004 | Cobzaru et al. | 173/1 |
| 6,817,424 B1 | 11/2004 | Su et al. | |
| D502,071 S | 2/2005 | Snider | |
| 6,876,173 B2 | 4/2005 | Mastaler et al. | |
| 6,933,689 B2 | 8/2005 | Yamamoto | |
| 6,938,706 B2 | 9/2005 | Ng | |
| 6,969,974 B1 | 11/2005 | Liu | |
| 6,996,909 B1 | 2/2006 | Buck et al. | |
| 7,005,831 B2 | 2/2006 | Watson et al. | |
| 7,055,622 B2 | 6/2006 | Bone | |
| 7,063,148 B2 | 6/2006 | Jabusch | |

| | | | |
|---|---|---|---|
| D528,502 S | 9/2006 | Fleetwood | |
| 7,105,249 B2 | 9/2006 | Hall et al. | |
| D531,117 S | 10/2006 | Schrick et al. | |
| 7,145,314 B2 | 12/2006 | Aradachi et al. | |
| 7,156,187 B1 * | 1/2007 | Townsan | 173/1 |
| 7,157,882 B2 | 1/2007 | Johnson et al. | |
| 7,164,257 B2 | 1/2007 | Johnson et al. | |
| 7,176,654 B2 | 2/2007 | Meyer et al. | |
| D539,217 S | 3/2007 | Hamaguchi | |
| 7,191,677 B2 | 3/2007 | Barkdoll | |
| 7,207,233 B2 * | 4/2007 | Wadge | 74/412 R |
| D543,143 S | 5/2007 | Hamaguchi | |
| D547,264 S | 7/2007 | Kondo | |
| 7,273,676 B2 | 9/2007 | Wheeler et al. | |
| 7,285,934 B2 | 10/2007 | Chang | |
| 7,425,816 B2 | 9/2008 | Meyer et al. | |
| 7,589,500 B2 | 9/2009 | Johnson et al. | |
| 7,649,337 B2 | 1/2010 | Proctor et al. | |
| 2002/0011344 A1 | 1/2002 | Alsruhe | |
| 2002/0022159 A1 | 2/2002 | Pierson et al. | |
| 2002/0064041 A1 | 5/2002 | Parker | |
| 2002/0089306 A1 | 7/2002 | Kubale et al. | |
| 2002/0100597 A1 | 8/2002 | Numata | |
| 2003/0010158 A1 * | 1/2003 | Listl et al. | 81/57.13 |
| 2003/0095842 A1 | 5/2003 | Bone | |
| 2003/0134187 A1 | 7/2003 | Wheeler et al. | |
| 2003/0224247 A1 | 12/2003 | Wheeler et al. | |
| 2004/0069512 A1 | 4/2004 | Ng | |
| 2004/0159172 A1 * | 8/2004 | Barkdoll | 74/423 |
| 2004/0231170 A1 | 11/2004 | Neitzell et al. | |
| 2004/0257035 A1 | 12/2004 | Chang | |
| 2004/0263119 A1 | 12/2004 | Meyer et al. | |
| 2005/0115708 A1 | 6/2005 | Jabusch | |
| 2005/0151507 A1 | 7/2005 | Smith | |
| 2005/0196665 A1 | 9/2005 | Shimizu et al. | |
| 2006/0070459 A1 | 4/2006 | Kugler | |
| 2006/0071634 A1 | 4/2006 | Meyer et al. | |
| 2006/0091858 A1 | 5/2006 | Johnson et al. | |
| 2006/0103357 A1 | 5/2006 | Johnson et al. | |
| 2006/0113956 A1 | 6/2006 | Bublitz et al. | |
| 2006/0123941 A1 * | 6/2006 | Wadge | 74/395 |
| 2007/0084616 A1 | 4/2007 | Lam et al. | |
| 2009/0102420 A1 | 4/2009 | Proctor et al. | |

FOREIGN PATENT DOCUMENTS

| | | |
|---|---|---|
| CN | 2355849 Y | 12/1999 |
| CN | 1252337 | 5/2000 |
| CN | 2390728 Y | 8/2000 |
| CN | 1267069 A | 9/2000 |
| CN | 1307513 | 8/2001 |
| CN | 1317394 A | 10/2001 |
| CN | 2471484 Y | 1/2002 |
| CN | 2502850 Y | 7/2002 |
| CN | 1370101 A | 9/2002 |
| CN | 1419986 A | 5/2003 |
| CN | 1421301 A | 6/2003 |
| CN | 2644105 Y | 9/2004 |
| CN | 1947957 | 4/2007 |
| DE | 3625135 | 2/1988 |
| DE | 3742268 | 6/1989 |
| DE | 4116343 | 11/1992 |
| EP | 0267472 | 5/1988 |
| EP | 0422773 | 4/1991 |
| EP | 0572327 | 12/1993 |
| EP | 0768138 | 4/1997 |
| EP | 1203628 | 5/2002 |
| GB | 2026928 | 2/1980 |
| GB | 2293056 | 3/1996 |
| GB | 2385675 | 8/2003 |
| JP | 2005138246 | 6/2005 |
| WO | 9220491 | 11/1992 |
| WO | 2007056172 | 5/2007 |
| WO | 2007056254 | 5/2007 |
| WO | 2007056255 | 5/2007 |
| WO | 2007056370 | 5/2007 |

OTHER PUBLICATIONS

Panasonic Catalog on website featuring EY6225CQ—3.6V Cordless Drill & Driver, http://catalog.2.panasonic.com/webapp/wcs/stores/servlet/vModelDetail?displayTab=O&st..., visited Apr. 28, 2005.
Panasonic Catalog on website featuring EY6220B—2.4V Cordless Drill & Driver with 15-minute charging system, http://catalog2.panasonic.com/webapp/wcs/stores/servlet/vModelDetail?displayTab=O&st..., visited Apr. 28, 2005.
GB0609768.7 Patent Application Search Report, dated Jun. 27, 2008, 5 pages.
Robert Bosch Tool Corporation, Bosch 11225VSRH Operating/Safety Instructions, English Version pp. 2-13, Printed in Germany, Nov. 2002.

* cited by examiner

POWER TOOL, BATTERY, CHARGER AND METHOD OF OPERATING THE SAME

CROSS-REFERENCE TO RELATED APPLICATIONS

This application is a continuation of U.S. patent application Ser. No. 11/435,640, filed on May 17, 2006, which claims priority to U.S. Provisional Patent Application No. 60/682,192, filed on May 17, 2005, the entire contents of both of which are hereby incorporated by reference.

BACKGROUND

The present invention relates generally to power tools, and more particularly to rotary power tools, such as drills and screwdrivers.

Power tools, such as rotary power tools, are used to work on or cut a variety of workpieces, such as metal, wood, drywall, etc. Such tools typically include a housing, a motor supported by the housing and connectable to a power source, and a spindle rotatably supported by the housing and selectively driven by the motor. A tool holder, such as a chuck, is mounted on the forward end of the spindle, and a tool element, such as, for example, a drill bit, is mounted in the chuck for rotation with the chuck and with the spindle to operate on a workpiece.

SUMMARY

In some embodiments, the invention provides a method of operating a power tool. The power tool can include a housing supporting a motor, a switch assembly, and a fuel gauge. The method can include the acts of activating the switch assembly to electrically connect the motor and a battery, recording a state of charge of the battery, displaying the state of charge of the battery on the fuel gauge before electrically connecting the motor and the battery, and stopping the display of the state of charge before deactivating the switch assembly.

In other embodiments, the invention provides a method of operating a power tool including a housing supporting a motor and a fuel gauge. The method can include the acts of connecting a battery to the housing, the battery having an at rest state of charge, displaying the at rest state of charge of the battery on the fuel gauge, and activating the motor and continuing to display the at rest state of charge of the battery on the fuel gauge.

The invention also provides a power tool including a movable spindle for supporting a tool element, and a housing supporting a motor and a drive mechanism driven by the motor. The drive mechanism can be operably connected to the spindle for causing movement of the spindle relative to the housing. The housing can have a forward end supporting the spindle and a rearward end. The power tool can also include a battery connectable to the rearward end, and a fuel gauge supported on the housing for displaying an at rest state of charge of the battery.

In some embodiments, the invention provides a method of operating a battery charger. The battery charger can include a body defining an aperture and a charging circuit extending through the body. The method can include the acts of inserting a battery into the aperture along an insertion axis, electrically connecting the battery to the charging circuit to charge the battery and pivoting the battery about the axis relative to the battery charger to secure the battery in the battery charger.

In other embodiments, the invention provides a method of operating a battery charger. The battery charger can include a body and a charging circuit. One of the charger and the battery can include an outwardly extending protrusion, and the other of the charger and the battery can define a recess for receiving the outwardly extending protrusion. The method can include the acts of electrically connecting the battery and the charging circuit to charge the battery before engaging the protrusion in the recess to secure the battery to the body of the charger.

In other embodiments, the invention provides a method of operating a battery charger. The battery charger can include a body and a charging circuit extending through the body. The method can include the acts of electrically connecting the battery to the charging circuit to charge the battery, and moving the battery with respect to the battery charger to secure the battery to the body while continuing to charge the battery.

The invention also provides a combination of a battery and a battery charger. The battery can include a casing and a battery cell supported in the casing. The battery charger can include a body and a charging circuit. One of the charger and the battery can include an outwardly extending protrusion, and the other of the charger and the battery can define a recess for receiving the outwardly extending protrusion. The battery can be movable relative to the body of the charger between a locked position, in which the protrusion can lockingly engage the recess, and an unlocked position, in which the protrusion can removably engage the recess. The battery cell can be electrically connectable to the charging circuit of the battery charger when the battery is in the locked position and the unlocked position.

In some embodiments, the invention provides a power tool including a housing assembly having a first housing portion and a second housing portion supported for pivoting movement relative to the first portion about a pivot axis. The first housing portion supports a motor. The second housing portion includes a chuck for supporting a tool element. The power tool also includes a gear supported within the housing assembly for rotation relative to at least one of the first and second housing portions about the pivot axis. The gear is operable to transfer drive force from the motor to the tool element.

In other embodiments, the invention provides a power tool including a housing assembly having a first housing portion and a second housing portion supported for pivoting movement relative to the first housing portion about a pivot axis. The second housing portion supports a tool element. The power tool also includes a motor positioned substantially within the first housing portion, a first gear supported within the housing assembly for rotation about the pivot axis, and a second gear coupled to the motor. The second gear engages the first gear to transfer drive force from the motor to the first gear. The power tool further includes a third gear positioned substantially within the second housing portion and being engageable with the first gear to transfer drive force from the first gear to the tool element.

In still other embodiments, the invention provides a method of operating a power tool. The power tool includes a housing assembly having a first housing portion and a second housing portion supported for pivoting movement relative to the first housing portion about a pivot axis. The first housing portion supports a motor operable to drive a tool element supported by the second housing portion. The method includes providing a gear supported within the housing assembly for rotation relative to the housing assembly about the pivot axis, pivoting the second housing portion relative to the first housing portion to a pivoted position, and rotating the gear with the motor to transmit drive force from the motor to the tool element while in the pivoted position.

In some embodiments, the invention provides a power tool including a housing assembly having a first housing portion and a second housing portion pivotally coupled to the first portion. The first portion has a first longitudinal axis extending therethrough and the second portion has a second longitudinal axis extending therethrough. The power tool also includes a motor positioned substantially within the first housing portion, a tool element supported by the second housing portion, a first gear coupled to a shaft extending from the first housing portion and rotatable relative to the first housing portion about the first longitudinal axis, and a second gear coupled to a shaft extending from the second housing portion to transmit drive force from the motor to the tool element. The second housing portion is pivotable relative to the first housing portion to a first position, in which the first longitudinal axis and the second longitudinal axis are substantially parallel, and to a second position, in which the first longitudinal axis and the second longitudinal axis are non-parallel.

In other embodiments, the invention provides a power tool including a housing assembly having a first housing portion and a second housing portion pivotally coupled to the first housing portion, a first gear coupled to a shaft extending from the first housing portion and rotatable relative to the first housing portion substantially within a first plane, and a second gear supported substantially within the second housing portion and drivingly engaging the first gear. The second gear is rotatable substantially within a second plane, which is pivotable relative to the first plane.

Other aspects of the invention will become apparent by consideration of the detailed description and accompanying drawings.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
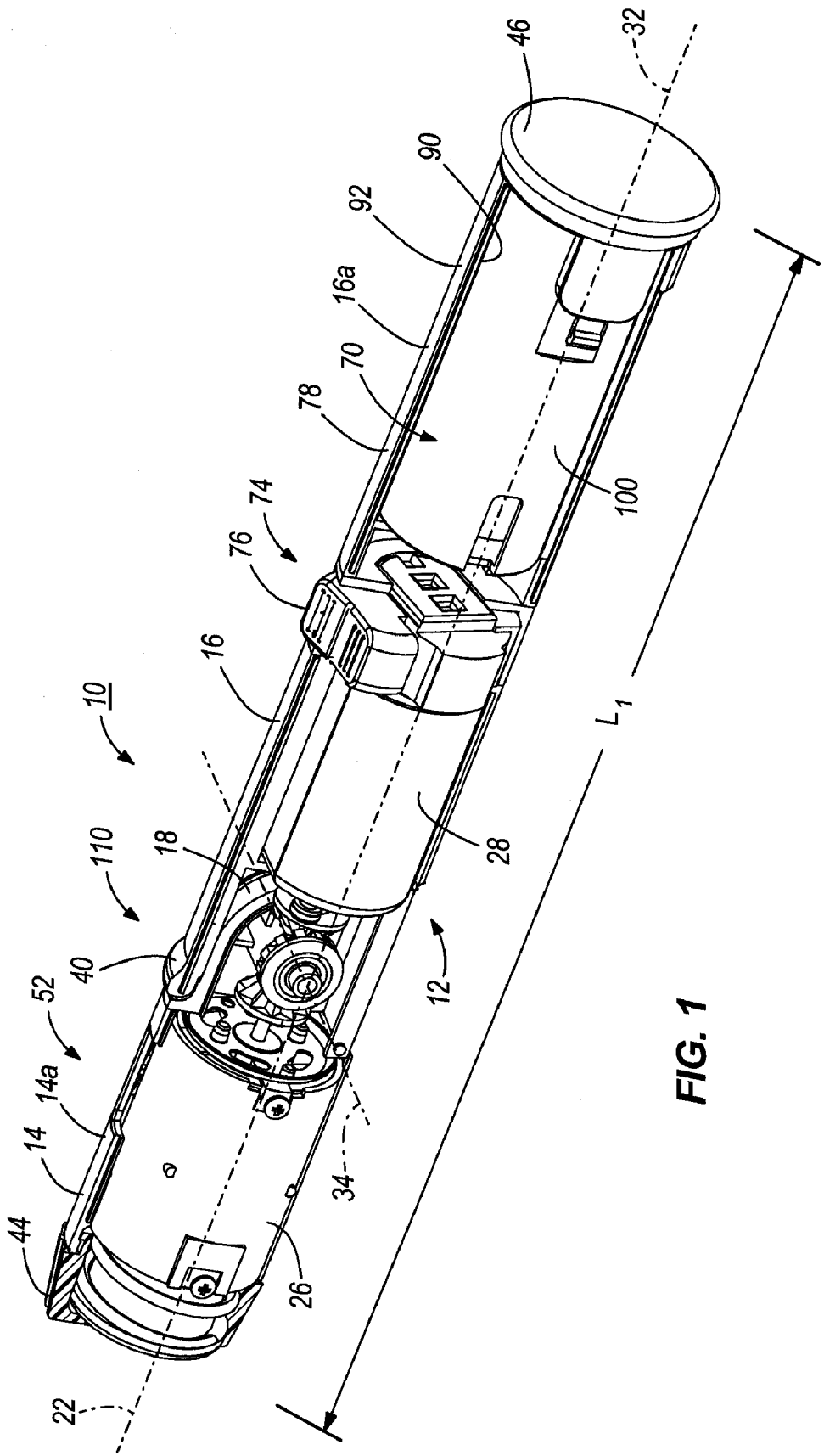
FIG. 1 is a rear perspective view of a power tool, such as a rotary tool, with portions cut away, and a battery according to some aspects and some constructions of the present invention and illustrating a hand grip in a first position.

FIGS. 1-4 illustrate a power tool, such as a screwdriver, a drill or another rotary tool 10. The rotary tool 10 includes a housing assembly 12 having a body 14 and a main operator's handle portion or hand grip 16 connected to a rearward portion 18 of the body 14.

The body 14 defines a longitudinal body axis 22 and houses a drive mechanism 26. The drive mechanism 26 and a motor 28 (described below), which is housed in the hand grip 16, are operable to rotate a tool (not shown) generally about a tool axis for working on a workpiece (also not shown).

As shown in FIGS. 1-4, the hand grip 16 is pivotably connected to the rearward portion 18 of the body 14 rearwardly of the drive mechanism 26. The hand grip 16 defines a grip axis 32 and is supported for pivoting movement relative to the body 14 about a pivot axis 34. In the illustrated construction, the pivot axis 34 is substantially perpendicular to both the body axis 22 and the grip axis 32.

In other constructions (not shown), the orientation of the axes 22, 32 and 34 may be different, such as generally parallel or skew. Also, the hand grip 16 may be movable in other manners, such as slidably, rotatably or pivotably about two axes (i.e., about the pivot axis 34 and about an axis parallel to the body axis 22 and/or to the grip axis 32).

In some constructions, the body 14 is formed of two body halves 14a (only one shown in FIGS. 1-4). Similarly, the hand grip 16 is formed of two grip halves 16a (only one shown in FIGS. 1-4). In these constructions, a first end 40 of the hand grip 16 sandwiches the rearward portion 18 of the body 14. A pivot pin 42, defining the pivot axis 34, extends through the first end 40 of the hand grip 16 and through the rearward portion 18 of the body 14 to pivotally connect the hand grip 16 to the body 14.

Figure 2:
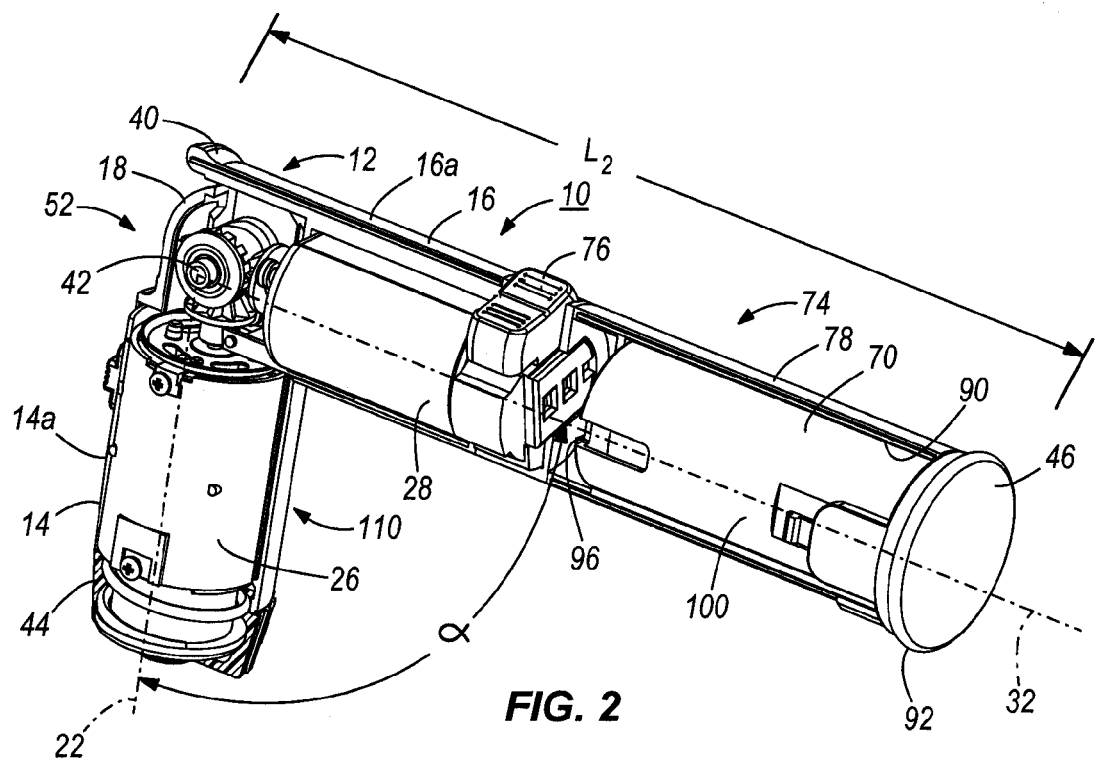
FIG. 2 is a rear perspective view of the power tool and the battery shown in FIG. 1 with portions cut away and illustrating the hand grip in a second position.
Figure 3:
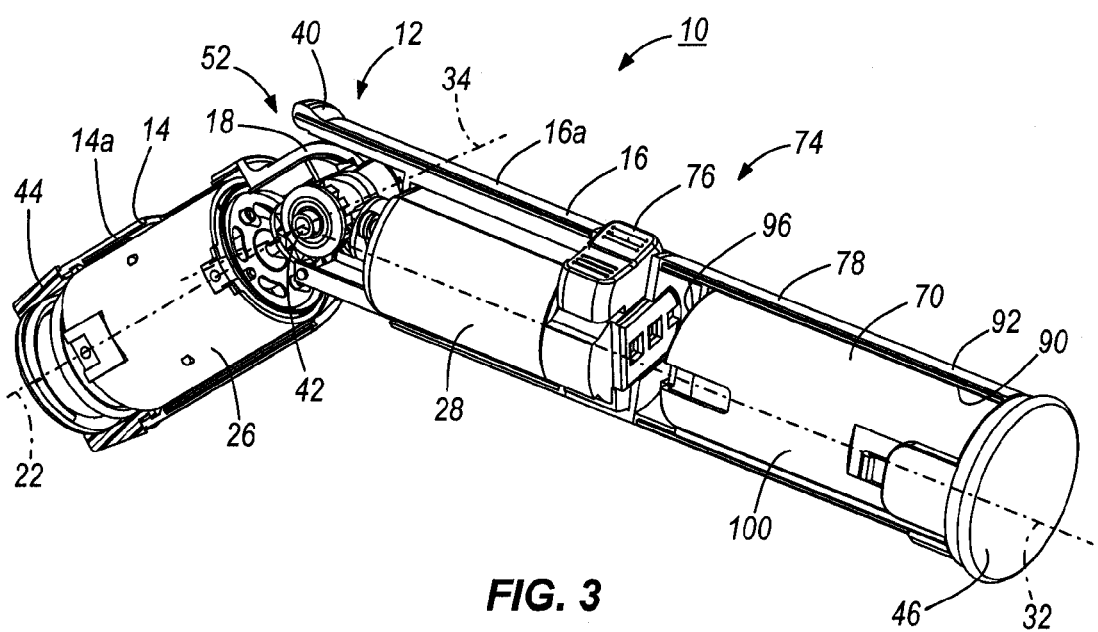
FIG. 3 is a rear perspective view of the power tool and the battery shown in FIG. 1 with portions cut away and illustrating the hand grip in a third position.

As shown in FIGS. 1-4, the hand grip 16 is movable relative to the body 14 between a first position (shown in FIG. 1), in which the body axis 22 and the grip axis 32 are generally aligned and are substantially parallel, and a second position (shown in FIG. 2), in which the grip axis 32 is misaligned with the body axis 22. In the second position, the hand grip 16 is positioned so that the grip axis 32 and the body axis 22 define an angle α of between about 80 degrees and about 100 degrees. As shown in FIG. 3, in some constructions, the hand grip 16 may be movable to one or more positions between the first and second positions in which the grip axis 32 is oriented at an acute angle and/or an obtuse angle α with respect to the body axis 22.

Also, as illustrated in FIGS. 1-4, the hand grip 16 is pivotable relative to the body 14 to change the length of the rotary tool 10, measured from the forward-most portion 44 of the body 14 to the rearward-most portion 46 of the hand grip 16. In the position shown in FIG. 1, the rotary tool 10 has a first length $L_1$ measured between the forward-most portion 44 of the body 14 and the rearward-most portion 46 of the handgrip 16. In the position shown in FIG. 2, the hand grip 16 is moved so that the rotary tool 10 has a second length $L_2$, shorter than the first length.

The rotary tool 10 can also include a connecting structure 52 for pivotably connecting the body 14 and the hand grip 16 and/or for transferring rotary motion between the motor 28 and the drive mechanism 26. The connecting structure 52 accommodates movement of the hand grip 16 and the motor 28 relative to the body 14 and the drive mechanism 26 so that, in any position of the hand grip 16 relative to the body 14, the motor 28 is operable to selectively power the drive mechanism 26.

Figure 4:
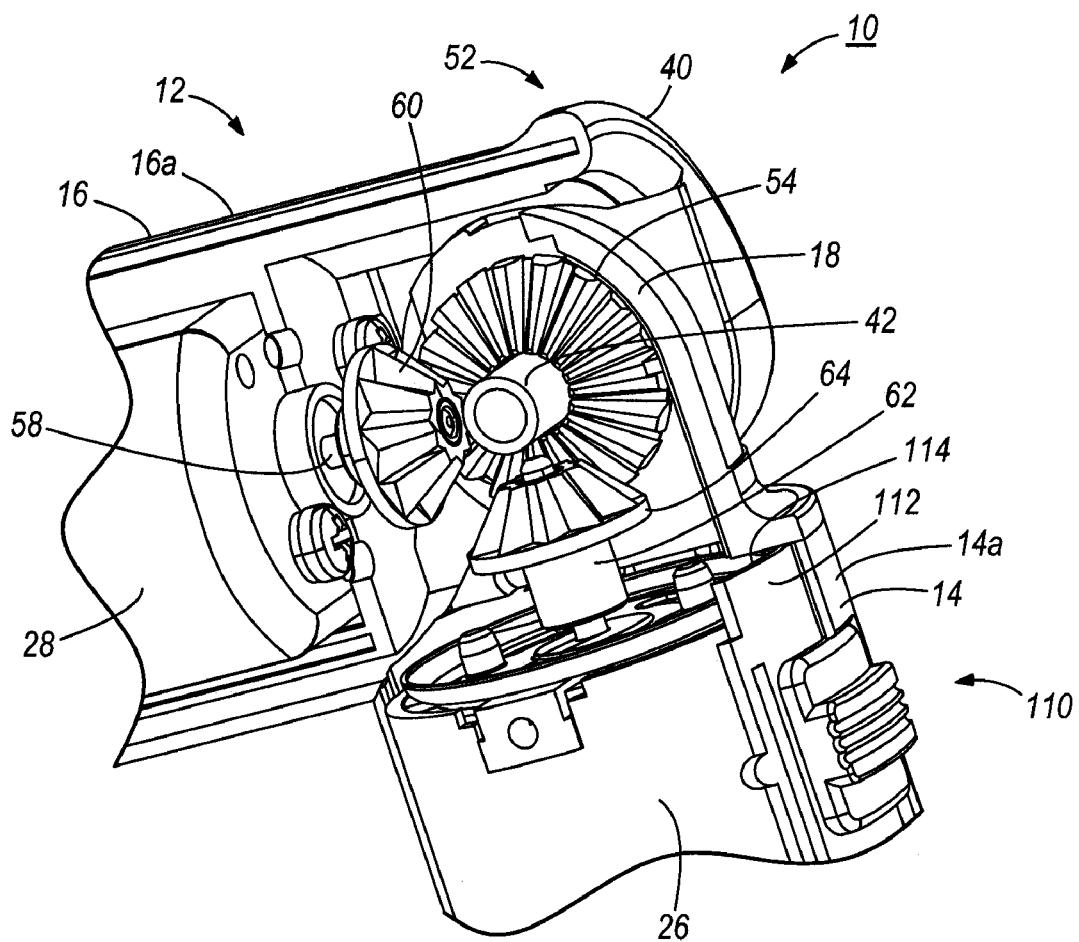
FIG. 4 is an enlarged side view of the power tool shown in FIG. 1 with portions cut away and illustrating a connecting structure.
Figure 5:
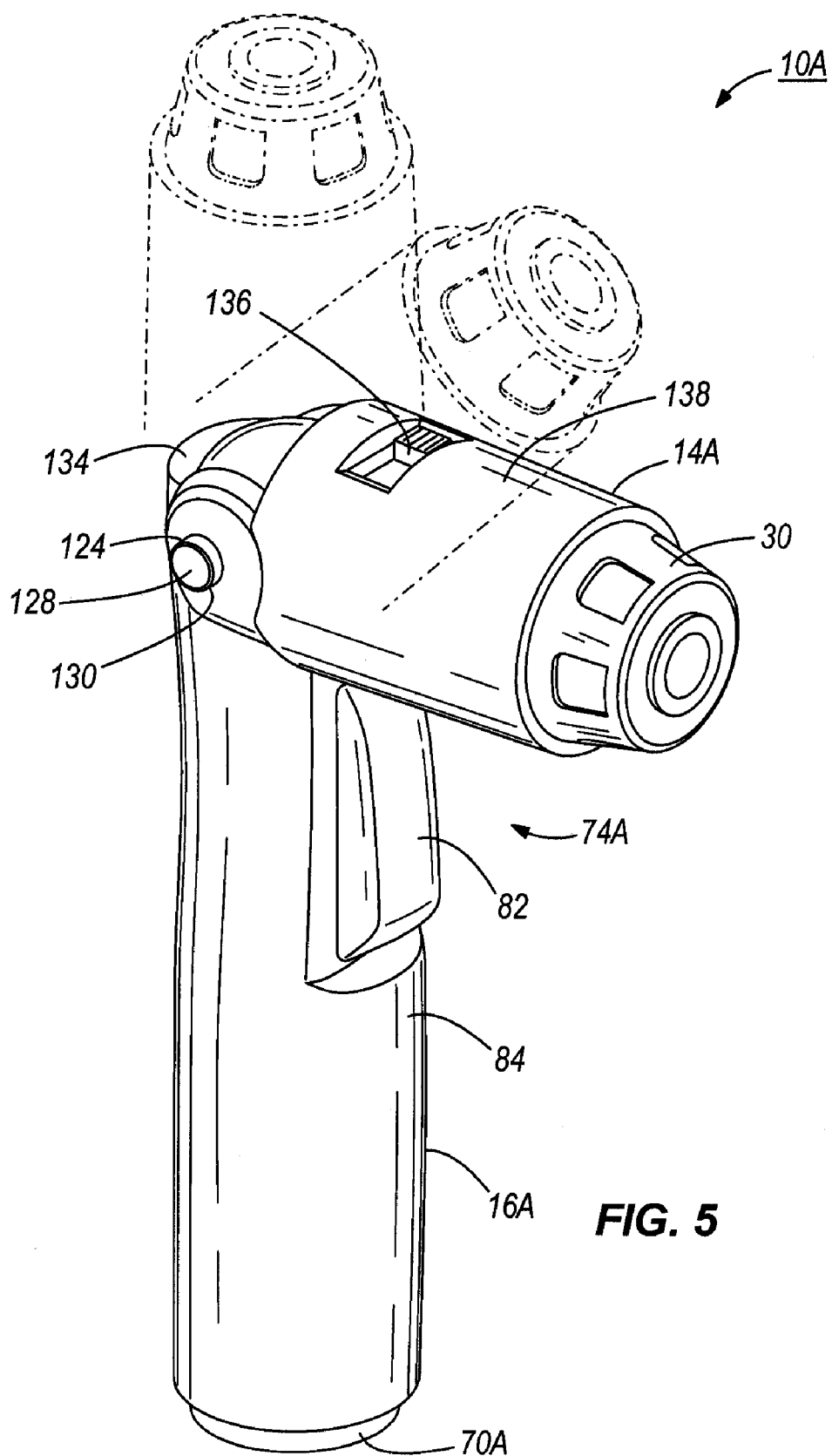
FIG. 5 is a perspective view of a power tool, such as a rotary tool, and a battery according to some aspects and some constructions of the present invention.
Figure 6:
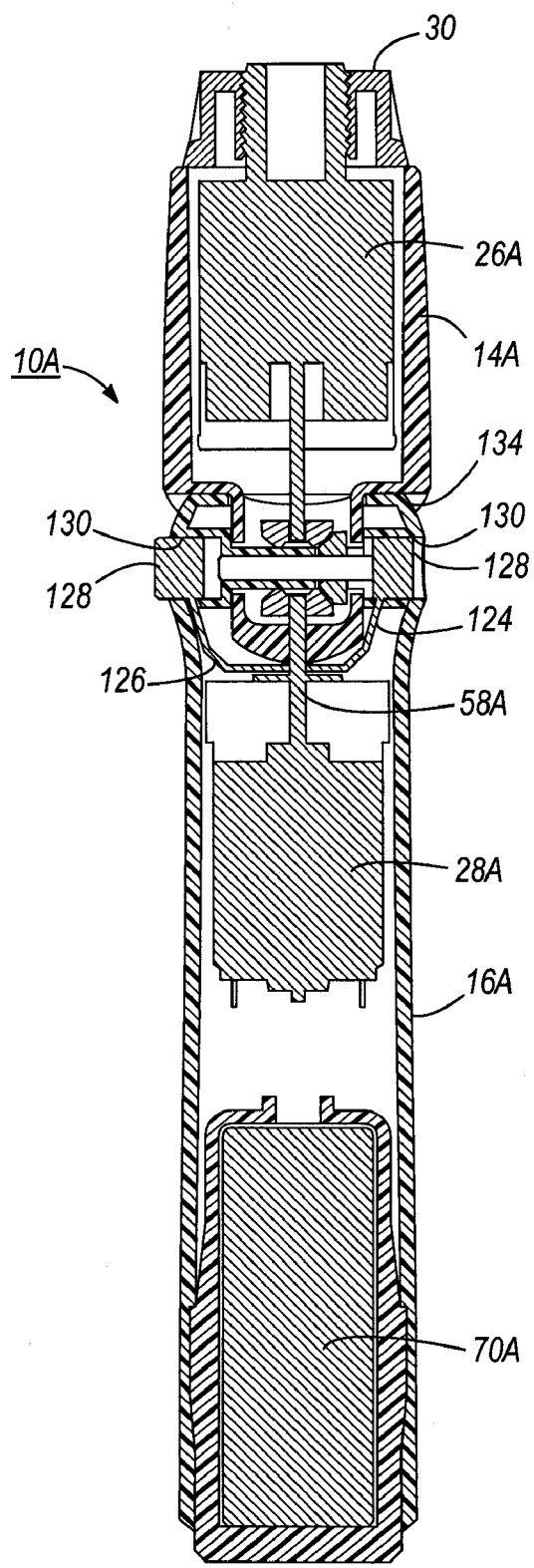
FIG. 6 is a cross sectional view of the power tool and the battery of FIG. 5 and illustrating a hand grip in a first position.
Figure 7:
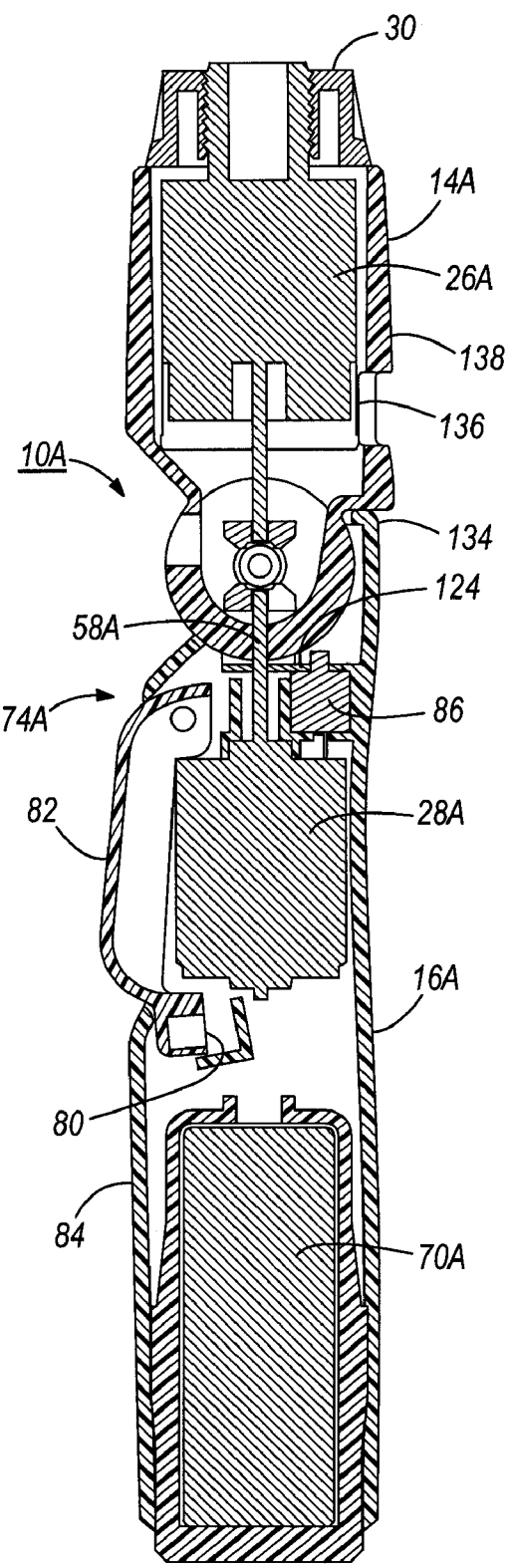
FIG. 7 is another cross sectional view of the power tool and the battery of FIG. 5.
Figure 8:
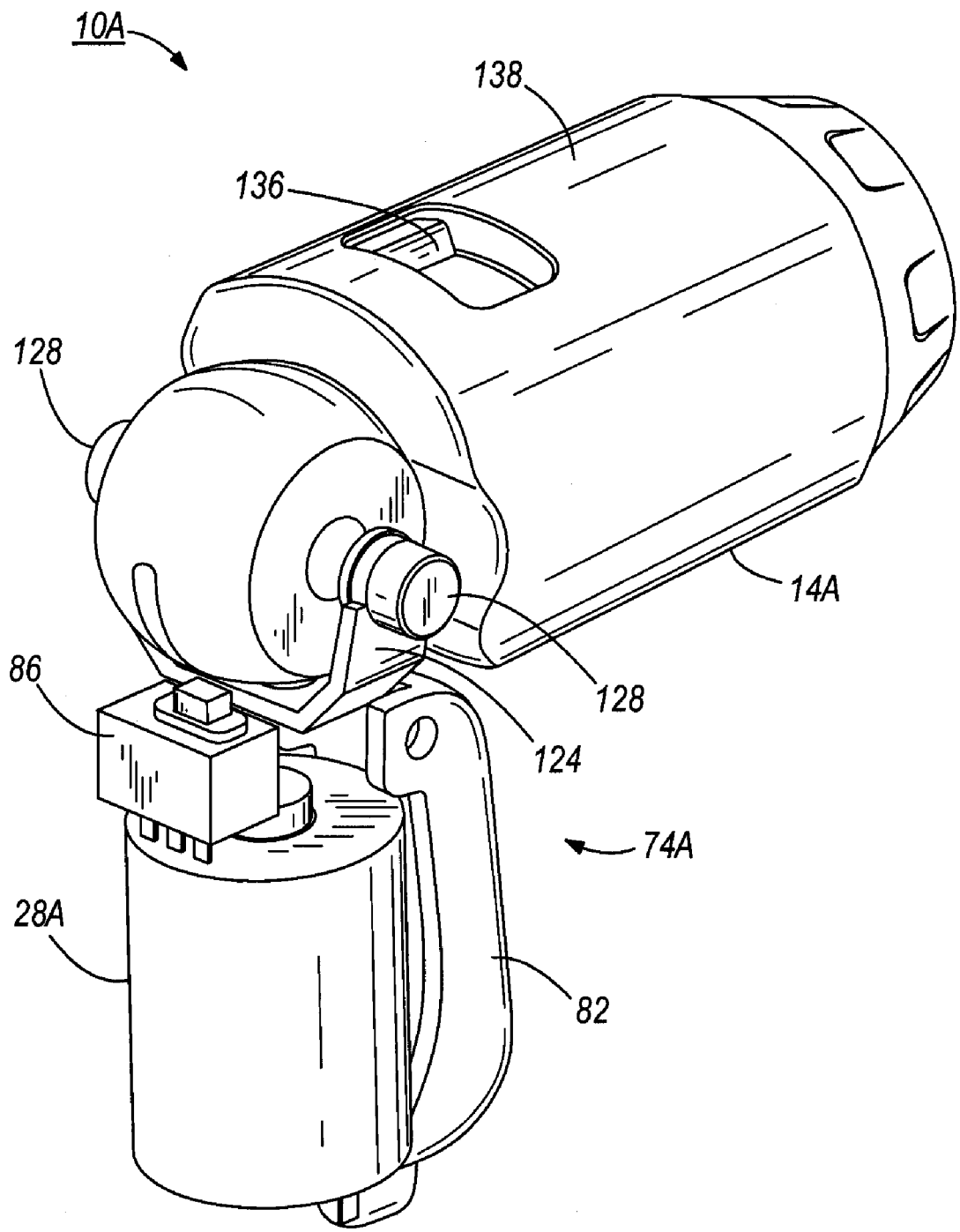
FIG. 8 is a rear perspective view of a portion of the power tool of FIG. 5 and illustrating the hand grip in a second position.
Figure 9:
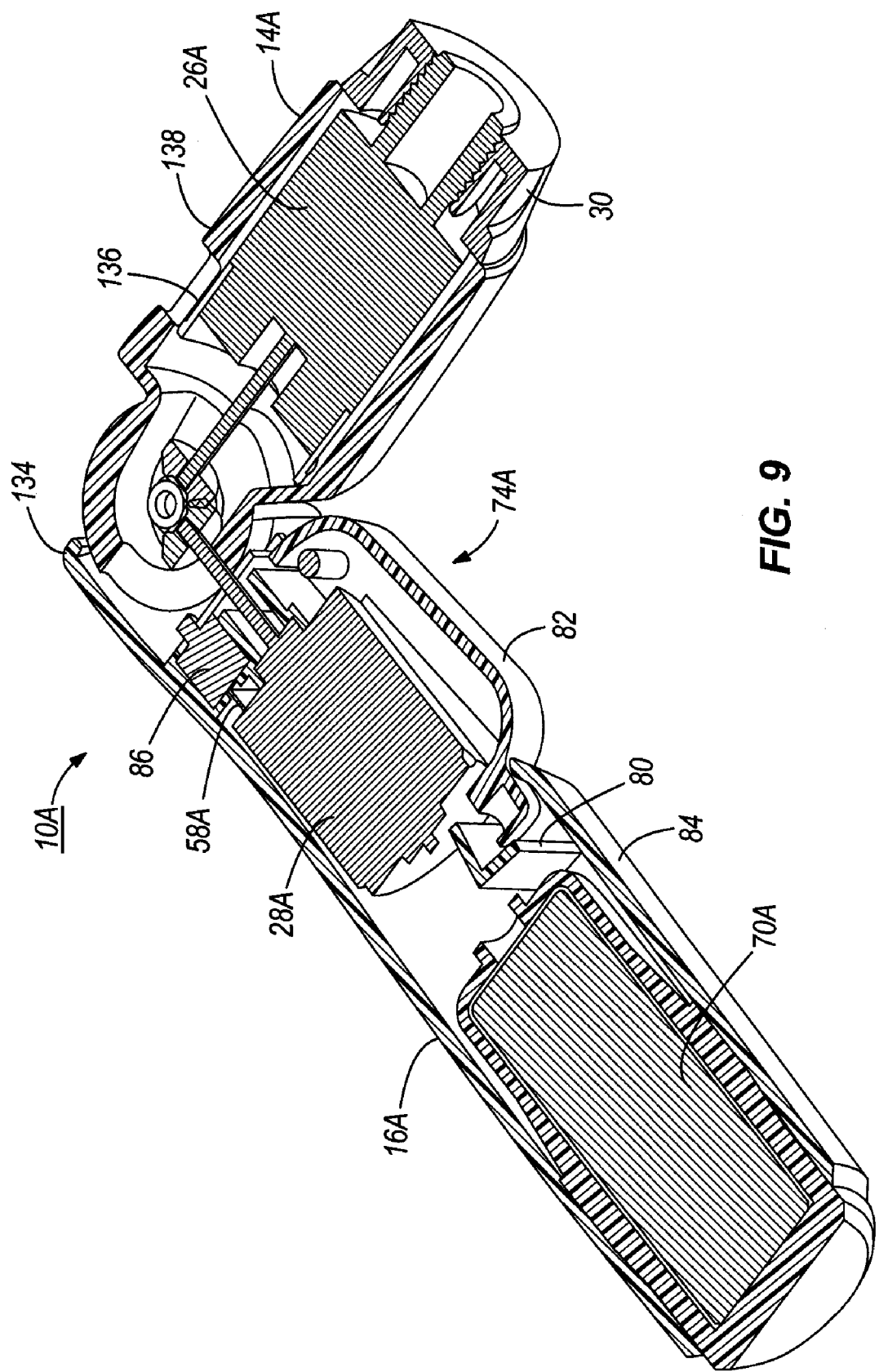
FIG. 9 is a cross sectional view of the power tool and the battery of FIG. 5.
Figure 11:
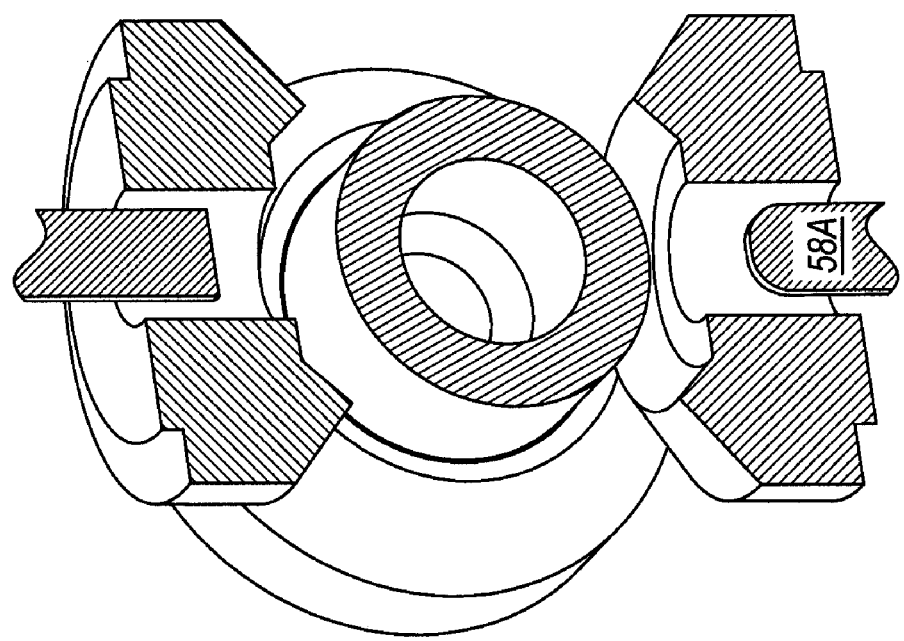
FIG. 11 is another cross sectional view of a portion of the connecting structure of the power tool of FIG. 5.
Figure 10:
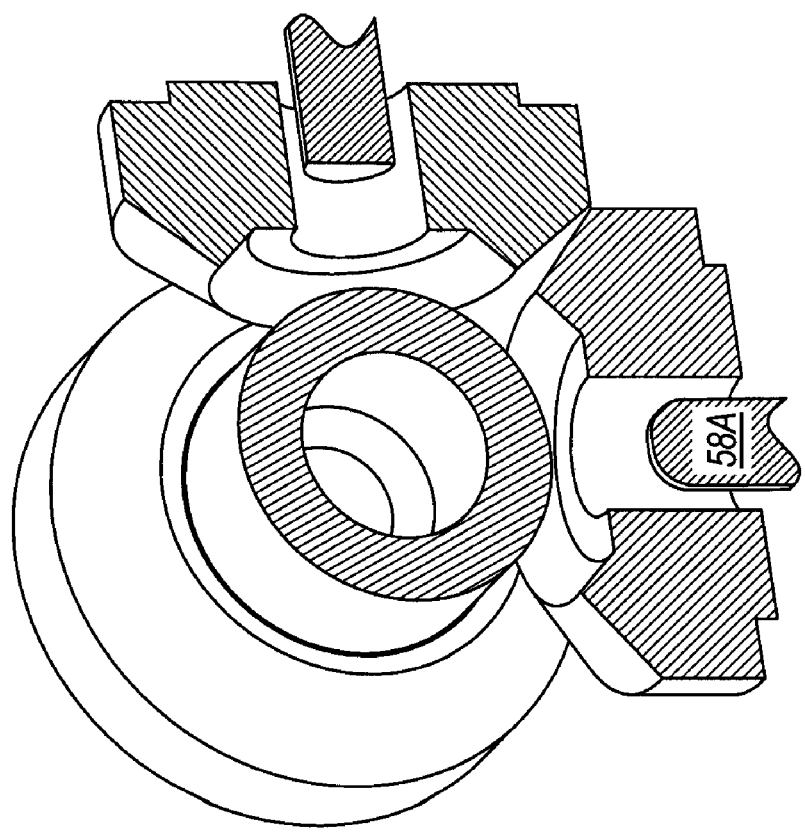
FIG. 10 is a cross sectional view of a portion of the connecting structure of the power tool of FIG. 5.
Figure 13:
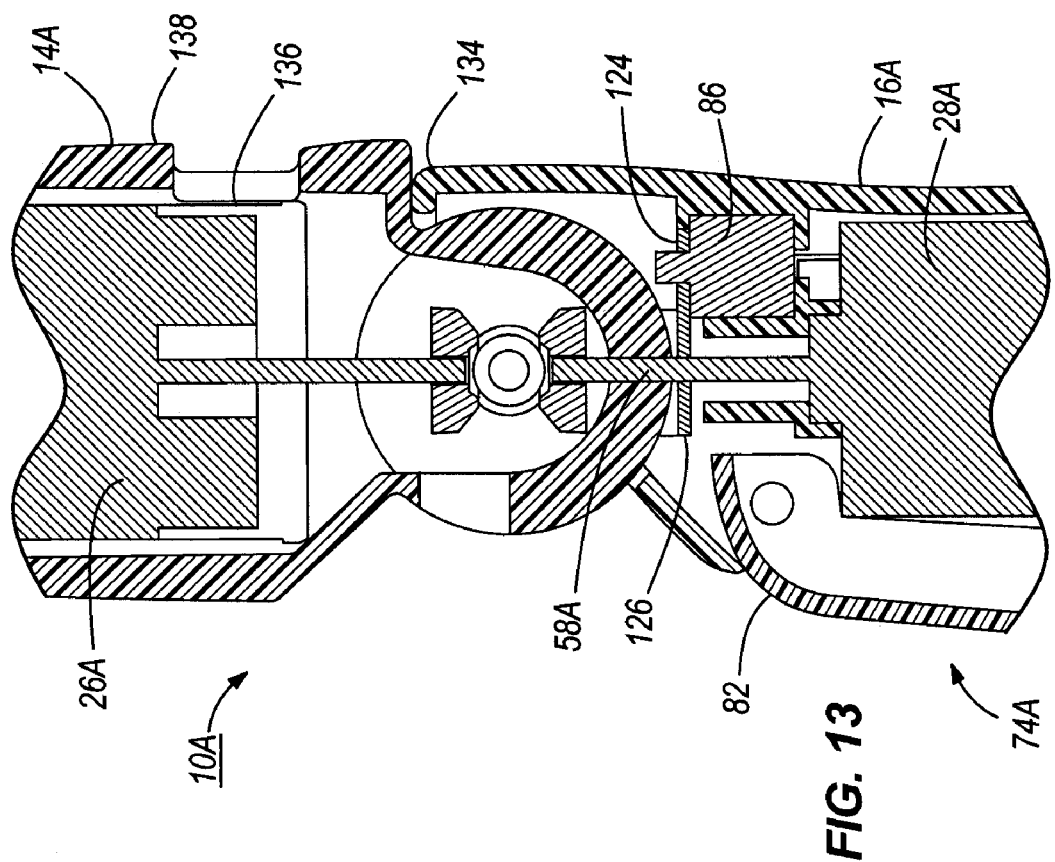
FIG. 13 is another cross sectional view of the power tool of FIG. 5.
Figure 12:
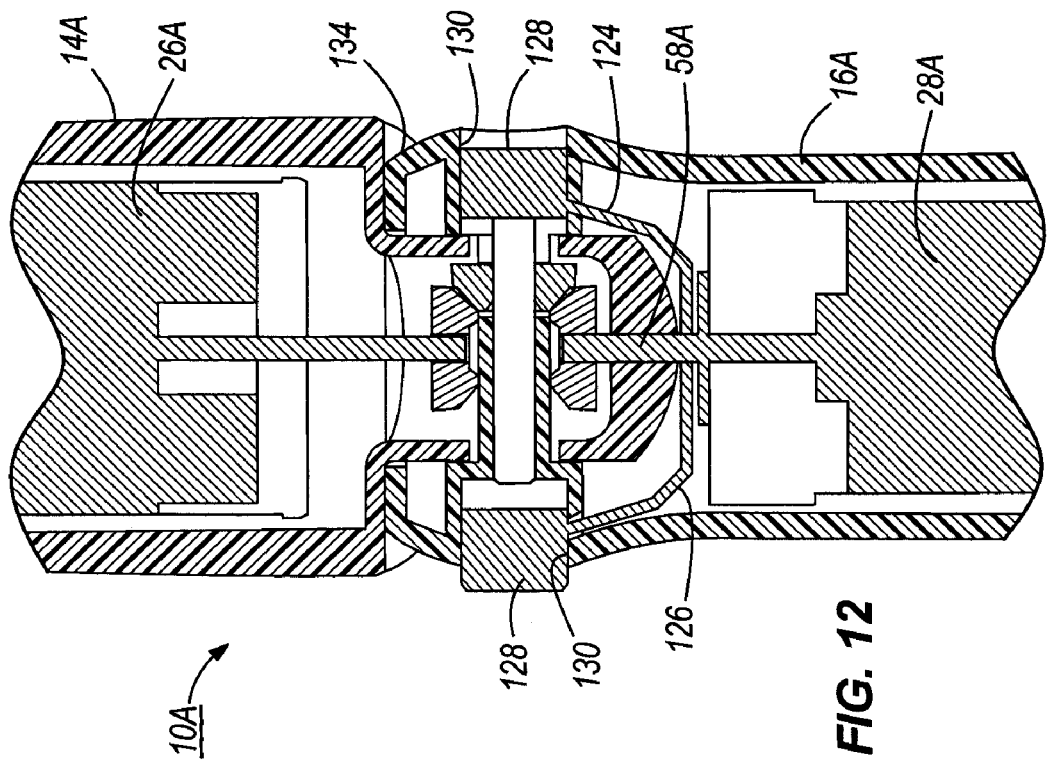
FIG. 12 is a cross sectional view of the power tool of FIG. 5.
Figure 15:
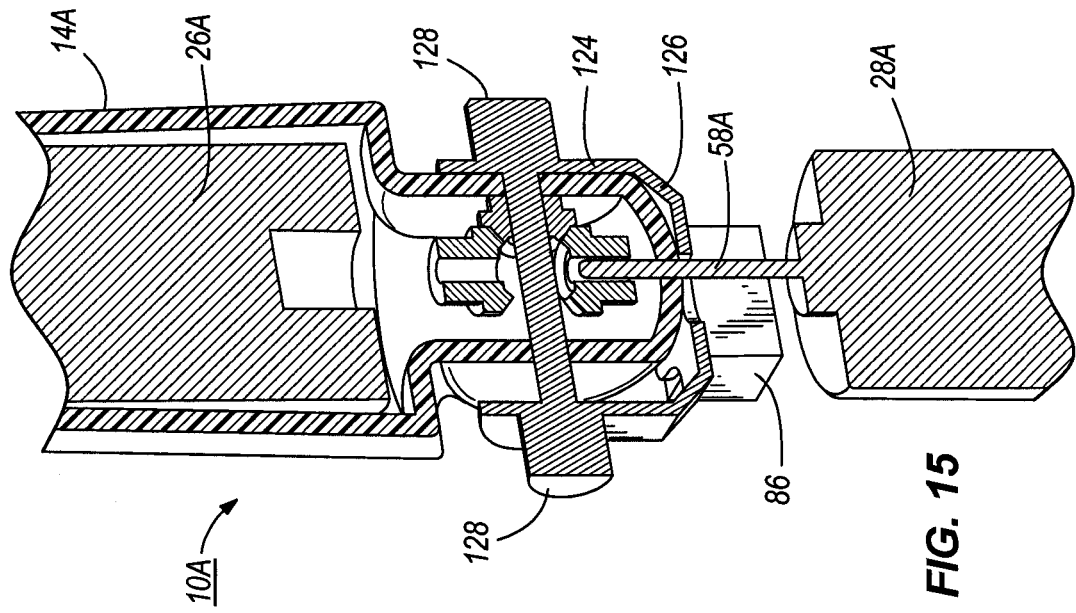
FIG. 15 is a cross sectional view of a portion of the power tool of FIG. 5.
Figure 14:
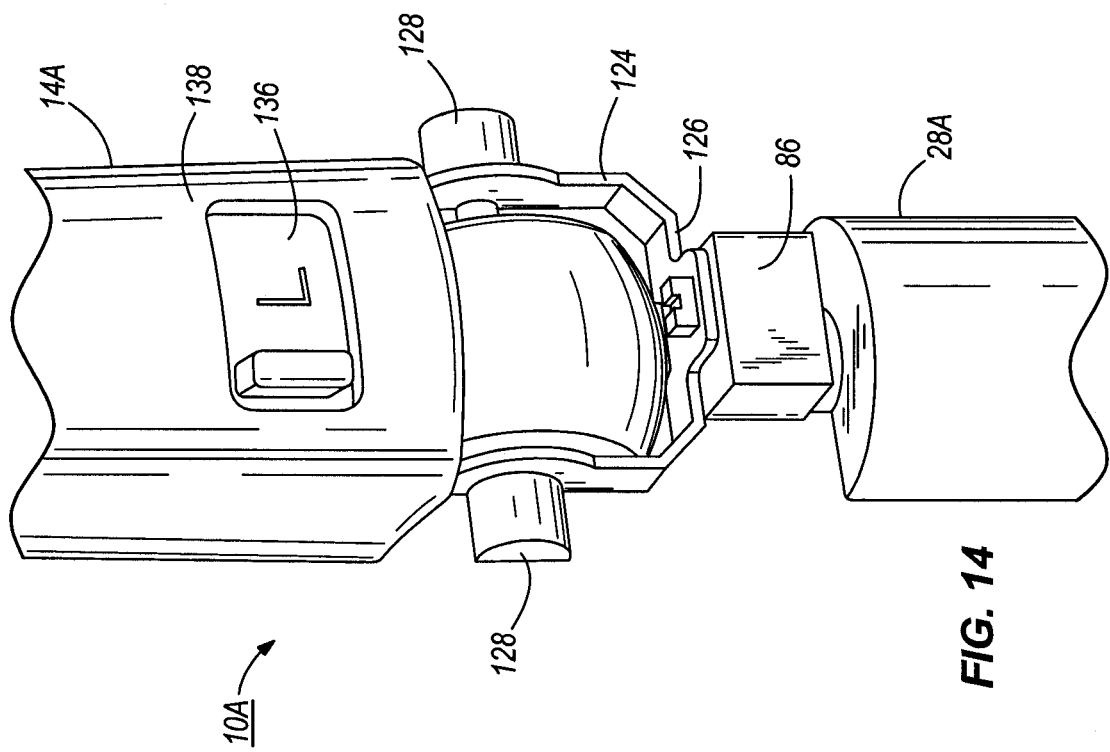
FIG. 14 is a front view of a portion of the power tool of FIG. 5.

In the illustrated construction of FIGS. 1-4, the connecting structure 52 includes the pivot pin 42 and a drive gear 54 supported on the pivot pin 42 for rotating movement relative to the pivot pin 42 about the pivot axis 34. As shown in FIG. 4, the motor 28 includes a motor shaft 58 and a motor pinion 60 supported on an end of the motor shaft 58 and engageable with the drive gear 54 to rotate the drive gear 54 about the pivot axis 34. As also shown in FIG. 4, the drive mechanism 26 includes a drive shaft 62 and a drive pinion 64 supported on an end of the drive shaft 62 and engageable with the drive gear 54 to receive rotational motion from the drive gear 54 as the drive gear 62 rotates about the pivot axis 34.

In the illustrated construction of FIG. 4, the drive gear 54 and the pinions 60, 64 are bevel gears, which accommodate movement of the motor 28 and the motor shaft 58 relative to the drive mechanism 26 and the drive shaft 62 during pivoting of the hand grip 16 relative to the body 14 about the pivot axis 34 while ensuring that the motor 28 (and, in the illustrated constriction, the motor pinion 60) remain in driving engagement with the drive mechanism 26 (and, in the illustrated construction, the drive pinion 64).

In other constructions and in other aspects, the connecting structure 52 may include other elements, such as a flexible drive shaft, for transferring rotational motion between the motor 28 supported in the hand grip 16 and the drive mechanism 26 supported in the body 14 and for facilitating pivoting movement of the hand grip 16 relative to the body 14.

With respect to the illustrated construction of FIGS. 1-4, the motor 28 is an electric motor that is connectable to a power source, such as a battery 70, by an electrical circuit. However, in other constructions (not shown), the motor 28 may be powered by another power source, such as, for example, by a power cord connected to an AC power source or to a DC power source.

The electrical circuit includes (see FIGS. 1-3) an on/off switch assembly 74 which is operable to connect the motor 28 to the power source. In the illustrated construction of FIGS. 1-3, the switch assembly 74 includes a direction switch 76 supported on an upper surface 78 of the hand grip 16 for operation by the thumb or finger of either a right-handed or a left-handed operator.

As shown in FIGS. 1-4, at least a portion of the switch assembly 74, such as the directional switch 76, is movable with the hand grip 16 and the motor 28 relative to the body 14 and relative to the drive mechanism 26 during pivoting movement of the hand grip 16.

In the illustrated construction of FIGS. 1-3, the battery 70 is removably supported in a battery chamber 90 located in a rearward end 92 of the hand grip 16 and is slidably attached to the hand grip 16 in a direction generally parallel to the grip axis 32. In other constructions and in other aspects, the hand grip 16 can support two or more batteries 70 in a battery chamber 90, or alternatively, the battery(ies) 70 can be slidably connected to an outer engagement surface of the hand grip 16.

The battery 70 includes electrical connectors 96 (only one shown in FIG. 2), which electrically connect the battery 70 to the electrical circuit and which physically connect the battery 70 to the hand grip 16. In the illustrated construction of FIGS. 1-3 and in some aspects, the battery 70 is substantially cylindrically shaped. In other constructions, the battery 70 can have other shapes and configurations, including without limitation round, oval, polygonal, irregular, and other cross-sectional shapes and the battery 70 can have two or more connectors 96 located on opposite ends of the battery 70, the side wall 100 of the battery 70 or in any other location on the battery 70.

As shown in FIGS. 1-4, the rotary tool 10 also includes a locking assembly 110 for locking the hand grip 16 in a position relative to the body 14. The locking assembly 110 is operable between a locked position (shown in FIG. 1), in which the hand grip 16 is fixed in a position relative to the body 14, and an unlocked condition (shown in FIG. 3), in which the position of the hand grip 16 relative to the body 14 is adjustable.

In the illustrated construction, the locking assembly 110 includes (see FIG. 4) a detent arrangement between the hand grip 16 and the body 14 to provide a positive engagement between the hand grip 16 and the body 14. The locking assembly 110 includes a locking member 112 having a locking projection 114. The locking projection 114 is selectively engageable in a first recess (not shown), to fix the hand grip 16 in the first position relative to the body 14, and a second recess (not shown), to fix the hand grip 16 in the second position relative to the body 14 (as shown in FIG. 2). In some constructions, the locking assembly 110 may also include additional recesses in which the locking projection 114 is engageable to fix the hand grip 16 in additional positions relative to the body 14. In some such constructions, a biasing member (not shown), such as a spring, biases the locking member 112 to the locked condition.

To move the hand grip 16 relative to the body 14, the locking projection 114 is moved out of engagement with the recesses. The hand grip 16 is then moved relative to the body 14 to a position corresponding to engagement of the locking projection 114 with one of the recesses. When the hand grip 16 is in the desired position, the locking projection 114 is moved into the corresponding recess.

In other constructions (not shown), the locking assembly 110 may include a different locking arrangement, such as a frictional engagement between the hand grip 16 and the body 14. In such a construction, the locking assembly 110 may also include a positive engagement arrangement, such as inter-engaging teeth formed on the body 14 and the hand grip 16 which are engaged when the locking assembly 110 is in the locked condition.

The locking assembly 110 may also include a pivoting lockout, which prevents the hand grip 16 from being pivoted about the pivot axis 34 relative to the body 14 when the motor 28 is in operation and/or when the switch assembly 74 is activated.

In operation, an operator grasps the hand grip 16 with a first hand and grasps the body 14 with a second hand and pivots the hand grip 16 about the pivot axis 34 from the first position (shown in FIG. 1) toward the second position (shown in FIG. 2), causing the drive pinion 64 to move circumferentially around the pivot axis 34 and the drive gear 54. The operator then inserts a tool into the drive mechanism 26 and moves the switch assembly 74 toward an operational position, causing the motor 28 to rotate the motor shaft 58 and causing the motor pinion 60 to drive the drive gear 54 about the pivot axis 34. The drive gear 54 then transfers rotational motion to the drive pinion 64 and the drive shaft 62, causing the drive mechanism 26 to rotate the tool about the tool axis 30.

The operator can then move the hand grip 16 from the second position back to the first position, or alternatively, to one of the intermediate positions (such as the intermediate position shown in FIG. 3) to orient the rotary tool 10 to operate in a confined workspace and/or to perform a different operation. Alternatively or in addition, an operator may pivot the hand grip 16 about the pivot axis 34 and relative to the body 14 with a flick of the wrist and/or by grasping one of the hand grip 16 and the body 14 with one hand and pressing the other of the hand grip 16 and the body 14 against his body.

FIGS. 5-15 illustrate an alternative construction of a power tool, such as a rotary tool 10A, and a battery 70A. Common elements are identified by the same reference number "A".

The rotary tool 10A includes a drive mechanism 26A having a chuck 30 for supporting a tool element (not shown). In the illustrated construction of FIGS. 5-15, the chuck 30 is a tool-less chuck, which is moveable between a locking position, in which the chuck 30 lockingly engages the tool element, and an unlocking position, in which the chuck 30 releasably supports the tool element, without the use of a wrench or chuck key. In other constructions and in other aspects, a wrench or chuck key may be used to move the chuck 30 between the locking position and the unlocking position.

In some constructions and in some aspects, the chuck 30 is operable in only one rotational direction (e.g., the forward rotational direction) and is inoperable or locked out in an opposite rotational direction. In other constructions and in other aspects, the chuck is operable at a first torque in a first rotational direction and is inoperable or locked out at a second torque.

The electrical circuit of the rotary tool 10A includes a switch assembly 74A operable to selectively electrically connect the motor 28A to a power source, such as, for example, a battery 70A. In the illustrated construction of FIGS. 5-15 and in some aspects, the switch assembly 74A includes an on/off switch 80 and a trigger 82 supported on a lower surface 84 of the hand grip 16A. At least a portion of the switch assembly 74A, such as the trigger 82 and/or the on/off switch 80, is moveable with the hand grip 16A about the pivot axis 34A and relative to the body 14A and the drive mechanism 26A.

In some constructions and in some aspects, the switch assembly 74A also includes a directional switch 86 moveable between a first position, in which the directional switch 86 causes the motor shaft 58A to be rotated in a first or forward rotational direction when power is supplied to the motor 28A, and a second position, in which the directional switch 86 causes the motor shaft 58A to be rotated in a second or reverse rotational direction when power is supplied to the motor 28A. In the illustrated construction of FIGS. 5-15, the directional switch 86 is supported in the hand grip 16A adjacent to the motor 28A.

In some constructions and in some aspects, the rotary tool 10 also includes an actuator 124 for moving the directional switch 86 relative to the hand grip 16A between the first position and the second position. In the illustrated construction of FIGS. 6-8 and 12-15, the actuator 124 is substantially U-shaped and includes a lower portion 126, which is positioned adjacent to the directional switch 86 and is engageable with the directional switch 86 to move the directional switch 86 between the first position and the second position. In the illustrated construction of FIGS. 6-8 and 12-15, the actuator 124 also includes protrusions 128, which extend outwardly through openings 130 on opposite sides of the hand grip 16A for engagement by an operator's finger.

As shown in FIGS. 5-8, 12 and 14-15, the protrusions 128 extend outward through openings 130 on opposite sides of the hand grip 16A adjacent to a forward end 134 of the hand grip 16A. As explained above, the on/off trigger 82 is supported on the lower surface 84 of the hand grip 16A. In this manner, an operator can engage the protrusions 128 with a thumb to move the directional switch 86 between the first position and the second position with a thumb while operating the on/off trigger 82 with one or more fingers of the same hand.

In some constructions and in some aspects, the rotary tool 10A can include a speed control mechanism 136, which is operable to adjust the rotational speed of a tool element supported by the rotary tool 10 between two or more different rotational speeds (e.g., a high speed, a low speed and intermediate speeds). As shown in FIGS. 5, 7-8 and 13-14, the speed control mechanism 136 is supported on an upper surface 138 of the body 14A and is operable to move the drive mechanism 26A between a first configuration, in which elements of the drive mechanism 26A are oriented to rotate a tool element about the tool axis at a first rotational speed, and a second configuration, in which elements of the drive mechanism 26A are oriented to rotate a tool element about the tool axis at a second, different rotational speed. In other constructions and in other aspects, the speed control mechanism 136 may be operable to control the power supplied by the power source (e.g., the battery 70A) to the motor 28A to rotate the motor shaft 58A at a first rotational speed and a second, different rotational speed.

Figure 16:
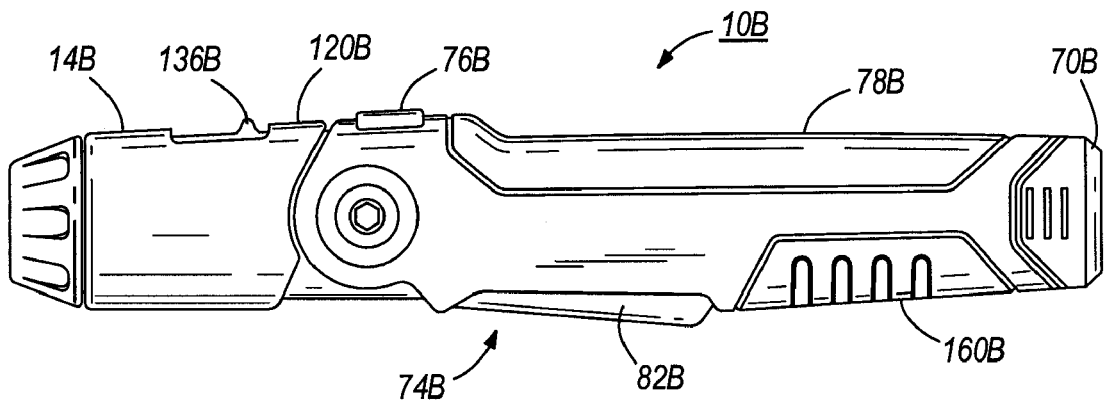
FIG. 16 is a side view of a power tool, such as a rotary tool, and a battery according to some aspects and some constructions of the present invention and illustrating a hand grip in a first position.
Figure 17:
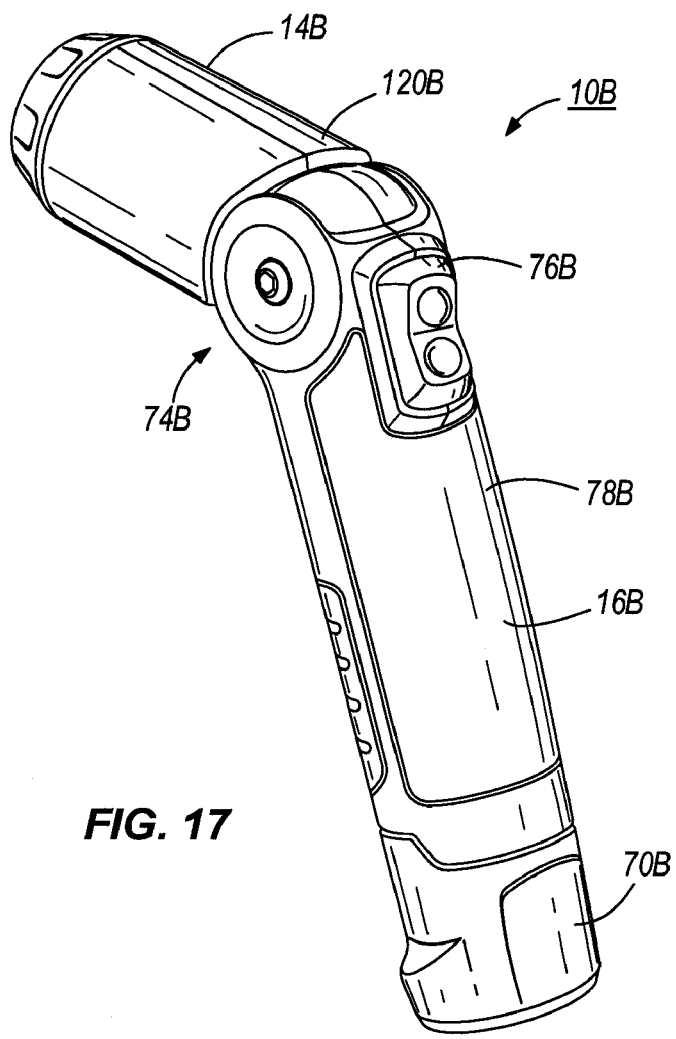
FIG. 17 is a rear perspective view of the power tool and the battery shown in FIG. 16 and illustrating the hand grip in a second position.
Figure 18:
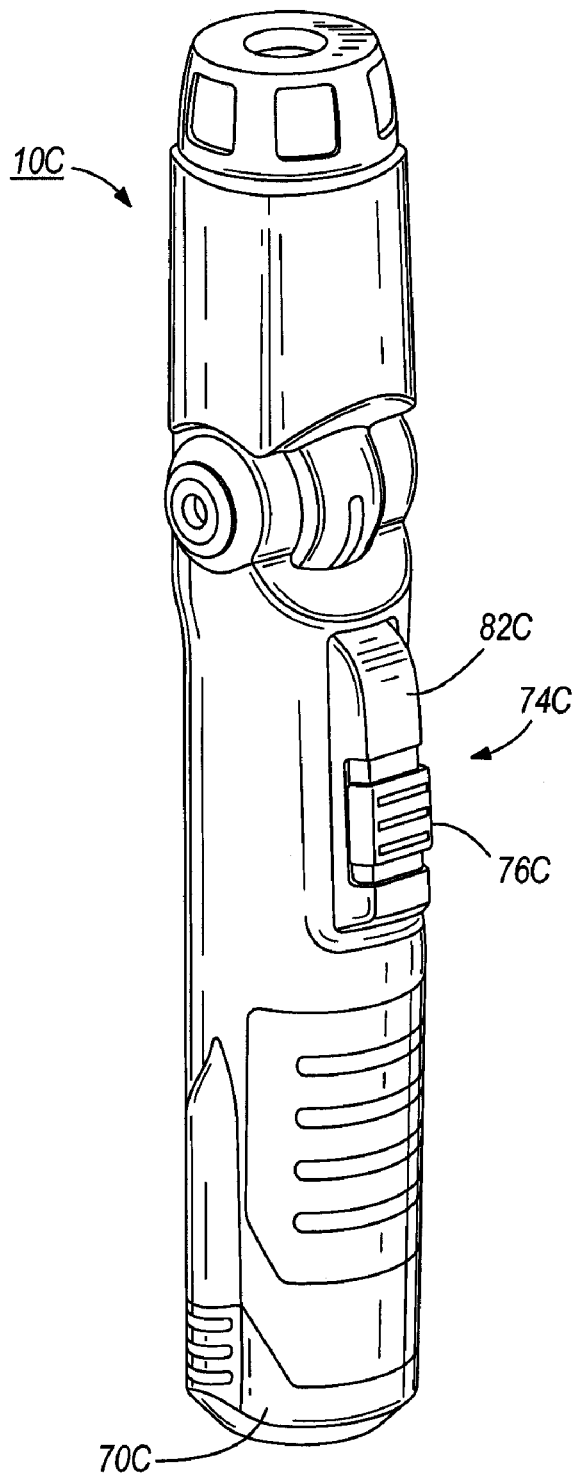
FIG. 18 is a bottom view of a power tool, such as a rotary tool, and a battery according to some aspects and some constructions of the present invention and illustrating a hand grip in a first position.
Figure 19:
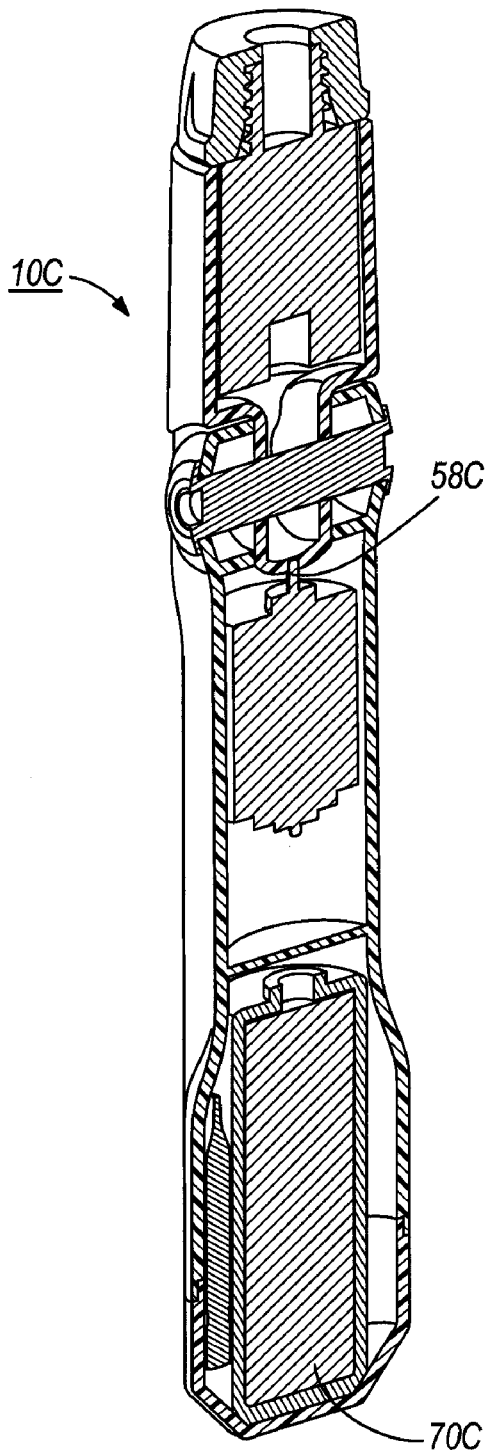
FIG. 19 is a cross sectional view of the power tool and the battery of FIG. 18.
Figure 20:
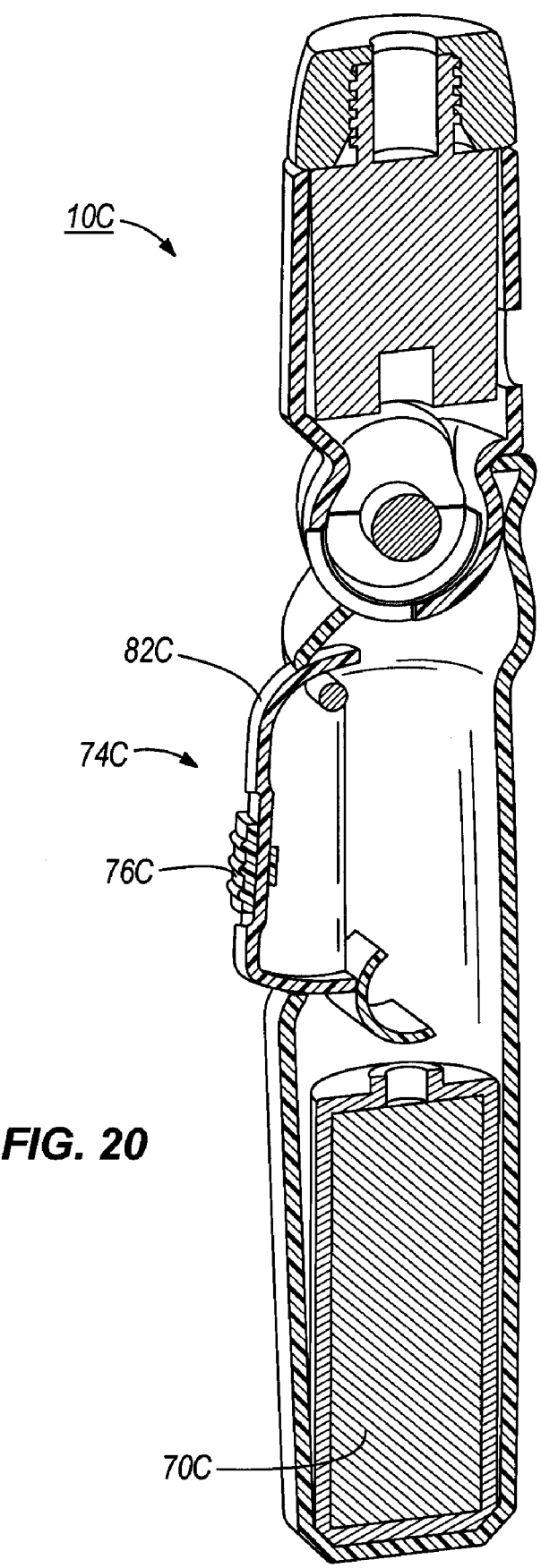
FIG. 20 is another cross sectional view of the power tool and the battery of FIG. 18.
Figure 21:
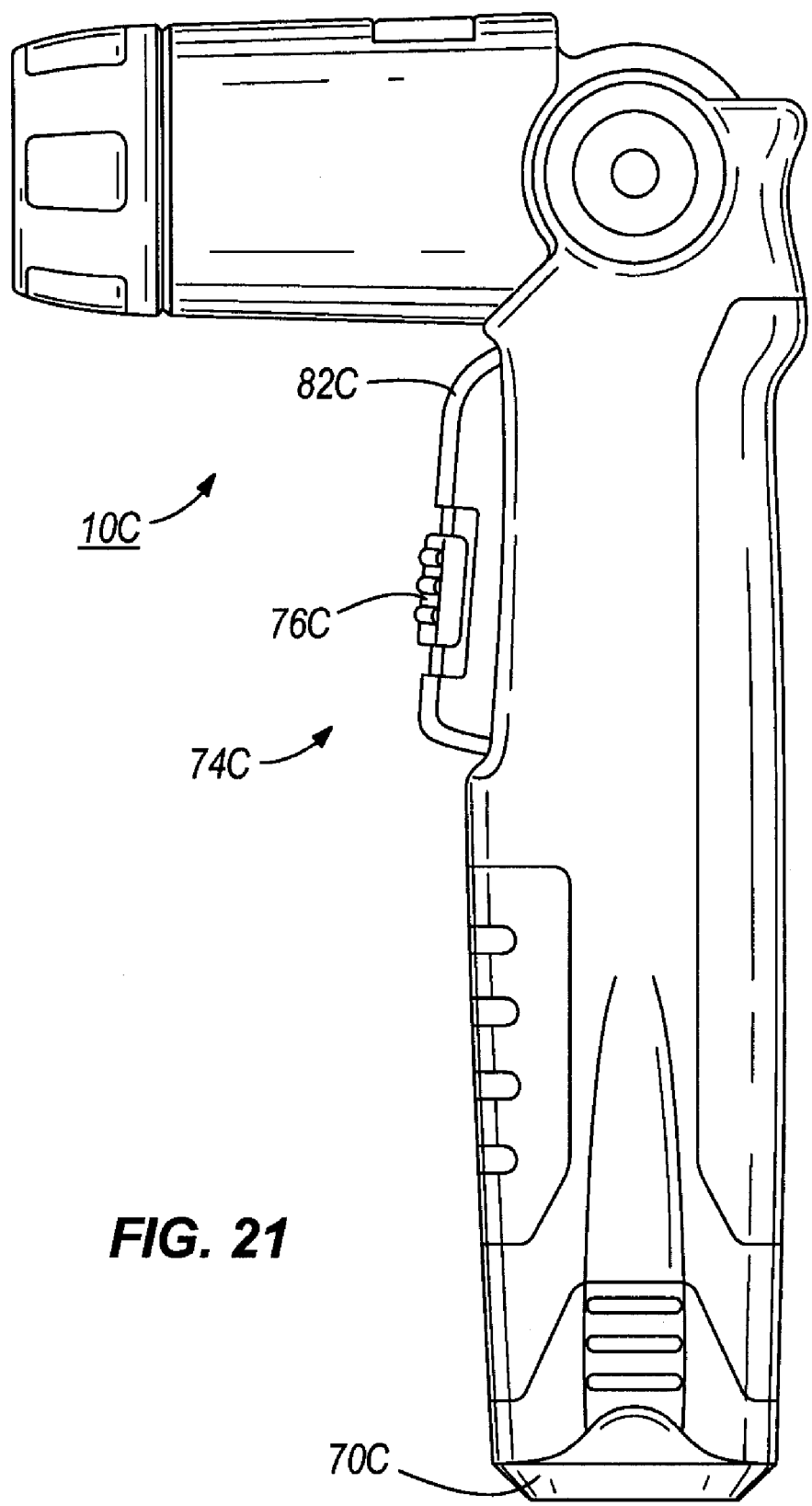
FIG. 21 is a side view of the power tool and the battery of FIG. 18 and illustrating the hand grip in a second position.

FIGS. 16-17 illustrate an alternative construction of a power tool, such as a rotary tool 10B, and a battery 70B. Common elements are identified by the same reference number "B".

In the illustrated construction of FIGS. 16-17, the electrical circuit of the rotary tool 10B includes a switch assembly 74B having a trigger or paddle 82 supported on a lower portion of the hand grip 16B for engagement by one or more fingers of an operator's hand. As shown in FIGS. 16-17, the electrical circuit also includes a directional switch 76B supported by an upper surface 78B of the hand grip 16B for engagement by an operator's thumb or finger while other fingers of the operator's hand engage the trigger 82B. As shown in FIG. 16, the rotary tool 10B may also include a speed control switch 136B positioned on an upper surface 170 of the body 14B for engagement by an operator's thumb or finger.

FIGS. 18-21 illustrate an alternative construction of a power tool, such as a rotary tool 10C, and a battery 70C. Common elements are identified by the same reference number "C".

In the illustrated embodiment of FIGS. 18-21, the switch assembly 74C includes an on/off trigger 82C supported on a lower surface 84C of the hand grip 16C. As shown in FIGS. 18-21, a directional switch 76C is slidingly supported on the on/off trigger 82C for movement between a first position (not shown) corresponding to a first rotational direction of the motor shaft 58C and a second position corresponding to a reverse rotational direction of the motor shaft 58C.

Although the invention has been described in detail with reference to certain preferred constructions, variations and modifications exist within the scope and spirit of one or more independent aspects of the invention as described.

What is claimed is:

1. A power tool comprising:
   a housing assembly including a first housing portion and a second housing portion supported for pivoting movement relative to the first housing portion about a pivot axis, the first housing portion supporting a motor, the second housing portion including a chuck for supporting a tool element;
   a first gear supported within the housing assembly for rotation relative to at least one of the first and second housing portions about the pivot axis, the first gear being operable to transfer drive force from the motor to the tool element;
   a second gear coupled to a shaft extending from the first housing portion, the shaft being rotatably coupled to the motor, the second gear engaging the first gear to transfer drive force from the motor to the first gear;
   a third gear supported substantially within the second housing portion and coupled to the chuck, the third gear engaging the first gear to transfer drive force from the first gear to the chuck; and
   an actuator extending through the housing assembly from an interior side to an exterior side, the actuator movable along the pivot axis between a first actuator position and a second actuator position to affect operation of the power tool, the first actuator position corresponding to a first operating condition of the power tool and the second actuator position corresponding to a second operating condition of the power tool different than the first operating condition.

2. The power tool of claim 1, wherein the second housing portion is pivotable to a first position, in which a longitudinal axis of the second housing portion is generally coaxial with a longitudinal axis of the first housing portion, and to a second position, in which the longitudinal axis of the second housing portion is non-parallel to the longitudinal axis of the first housing portion.

3. The power tool of claim 2, wherein, in the second position, the longitudinal axis of the second housing portion is at an obtuse angle relative to the longitudinal axis of the first housing portion.

4. The power tool of claim 2, wherein, in the second position, the longitudinal axis of the second housing portion is at a substantially right angle relative to the longitudinal axis of the first housing portion.

5. The power tool of claim 1 wherein at least one of the first gear, the second gear, and the third gear is a bevel gear.

6. The power tool of claim 1 wherein the second gear and the third gear are spaced apart from each other.

7. The power tool of claim 1, further comprising a battery at least partially supported in the first housing portion and operable to selectively provide power to the motor.

8. The power tool of claim 1, wherein the first housing portion has a first length measured along the first longitudinal axis and the second housing portion has a second length measured along the second longitudinal axis that is less than the first length.

9. The power tool of claim 1, wherein the power tool is a screwdriver.

10. The power tool of claim 1, wherein the motor rotates the shaft in a forward rotational direction when the actuator is in the first actuator position and the motor rotates the shaft in a reverse rotational direction when the actuator is in the second actuator position.

11. The power tool of claim 1, wherein the first housing portion sandwiches a portion of the second housing portion to couple the first housing portion to the second housing portion.

12. A power tool comprising:
    a housing assembly including a first housing portion and a second housing portion supported for pivoting movement relative to the first housing portion about a pivot axis, the second housing portion supporting a tool element;
    a motor positioned substantially within the first housing portion;
    a first gear supported within the housing assembly for rotation about the pivot axis;
    a second gear coupled to the motor, the second gear engaging the first gear to transfer drive force from the motor to the first gear;
    a third gear positioned substantially within the second housing portion and being engageable with the first gear to transfer drive force from the first gear to the tool element; and
    an actuator extending through the housing assembly from an interior side to an exterior side, the actuator movable along the pivot axis between a first actuator position and a second actuator position to affect operation of the power tool, the first actuator position corresponding to a first operating condition of the power tool and the second actuator position corresponding to a second operating condition of the power tool different than the first operating condition.

13. The power tool of claim 12, wherein the second housing portion is pivotable relative to the first housing portion about the pivot axis to a first position, in which a longitudinal axis of the second housing portion is generally inline with a longitudinal axis of the first housing portion, and to a second position, in which the longitudinal axis of the second housing portion is non-parallel to the longitudinal axis of the first housing portion.

14. The power tool of claim 12, wherein the power tool is a screwdriver, the first gear is a first bevel gear, the second gear is a second bevel gear, and the third gear is a third bevel gear, and further comprising:
    a battery at least partially supported on the first housing portion and configured to selectively provide power to the motor; and a switch assembly at least partially supported on the first housing portion and operable to connect the motor to the battery;

wherein the first housing portion defines a first longitudinal axis extending substantially perpendicular to the pivot axis and the second housing portion defines a second longitudinal axis extending substantially perpendicular to the pivot axis, the second bevel gear being rotatable about the first axis and the third bevel gear being rotatable about the second axis;

wherein the second housing portion is pivotable relative to the first housing portion about the pivot axis to a first position, in which the second axis is generally coaxial with the first axis, and to a second position, in which the second axis is angled relative to the first axis; and wherein the first housing portion has a first length measured along the first longitudinal axis and the second housing portion has a second length measured along the second longitudinal axis that is less than the first length.

15. The power tool of claim 12, wherein the motor rotates the tool element in a forward rotational direction when the actuator is in the first actuator position and the motor rotates the tool element in a reverse rotational direction when the actuator is in the second actuator position.

16. A method of operating a power tool, the power tool including a housing assembly having a first housing portion and a second housing portion supported for pivoting movement relative to the first housing portion about a pivot axis, the first housing portion supporting a motor operable to drive a tool element supported by the second housing portion, the power tool also including an actuator extending through the housing assembly from an interior side to an exterior side, the method comprising the acts of:

providing a first gear supported within the housing assembly for rotation relative to the housing assembly about the pivot axis, a second gear coupled to the motor and engaging the first gear, and a third gear coupled to the tool element and engaging the first gear;

moving the actuator along the pivot axis between a first actuator position and a second actuator position to affect operation of the power tool, the first actuator position corresponding to a first operating condition of the power tool and the second actuator position corresponding to a second operating condition of the power tool different than the first operating condition;

pivoting the second housing portion relative to the first housing portion to a pivoted position; and rotating the first gear, the second gear, and the third gear with the motor to transmit drive force from the motor to the tool element while in the pivoted position.

17. The method of claim 16, wherein pivoting the second housing portion to the pivoted position includes pivoting the second housing portion relative to the first housing portion to a position in which a longitudinal axis of the second housing portion is generally inline with a longitudinal axis of the first housing portion.

18. The method of claim 16, wherein, when the actuator is in the first actuator position, rotating the first gear, the second gear, and the third gear with the motor includes rotating the first gear, the second gear, and the third gear in a forward rotational direction; and wherein, when the actuator is in the second position, rotating the first gear, the second gear, and the third gear with the motor includes rotating the first gear, the second gear, and the third gear in a reverse rotational direction.

* * * * *